United States Patent
Yoshida et al.

(10) Patent No.: US 8,339,532 B2
(45) Date of Patent: Dec. 25, 2012

(54) LIQUID CRYSTAL DISPLAY DEVICE

(75) Inventors: Hiroshi Yoshida, Osaka (JP); Yasutoshi Tasaka, Osaka (JP); Noritaka Ajari, Osaka (JP); Kohhei Tanaka, Osaka (JP); Ryohji Yayotani, Osaka (JP); Keisuke Yoshida, Osaka (JP); Yoshito Hashimoto, Osaka (JP); Masayuki Soga, Osaka (JP); Hiroyuki Ohgami, Osaka (JP); Masakazu Shibasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 253 days.

(21) Appl. No.: 12/667,005

(22) PCT Filed: Mar. 11, 2008

(86) PCT No.: PCT/JP2008/054406
§ 371 (c)(1),
(2), (4) Date: Jun. 18, 2010

(87) PCT Pub. No.: WO2009/001585
PCT Pub. Date: Dec. 31, 2008

(65) Prior Publication Data
US 2010/0283928 A1 Nov. 11, 2010

(30) Foreign Application Priority Data
Jun. 27, 2007 (JP) ................................. 2007-169654

(51) Int. Cl.
*G02F 1/136* (2006.01)
(52) U.S. Cl. ........................................................ 349/43
(58) Field of Classification Search .................. None
See application file for complete search history.

(56) References Cited

U.S. PATENT DOCUMENTS

| 7,649,602 | B2 * | 1/2010 | Chen et al. ..................... 349/129 |
| 7,876,389 | B2 * | 1/2011 | Kim et al. ........................ 349/39 |
| 8,045,113 | B2 * | 10/2011 | Chen et al. ..................... 349/129 |
| 2001/0019392 | A1 | 9/2001 | Sakamoto |
| 2002/0159018 | A1 | 10/2002 | Kataoka |
| 2003/0043336 | A1 | 3/2003 | Hanaoka |

(Continued)

FOREIGN PATENT DOCUMENTS

CN 1410808 A 4/2003

(Continued)

OTHER PUBLICATIONS

Supplementary European Search Report dated Dec. 7, 2010.

(Continued)

*Primary Examiner* — Sung Pak
(74) *Attorney, Agent, or Firm* — Nixon & Vanderhye P.C.

(57) ABSTRACT

An active matrix liquid crystal display device includes: a liquid crystal layer; two substrates sandwiching the liquid crystal layer; and electrodes respectively provided in the two substrates, the electrodes applying voltage across the liquid crystal layer. A first electrode (15) in the substrate including a pixel selecting element (11) has a striped electrode pattern (15*c*) aligning liquid crystal molecules along a stripe line direction when voltage is applied across the liquid crystal layer. A contact (25*h*) of the first electrode (15) with the selecting element (11) is formed in a region opposed to, along a film thickness direction, a first region to which a signal liner (GLi) is allocated. This provides a liquid crystal display device in which a contact is made with the pixel electrode having the striped electrode pattern having the periodical arrangement, while alignment disorder of the liquid crystal molecules is not reflected on display.

13 Claims, 5 Drawing Sheets

U.S. PATENT DOCUMENTS

| | | |
|---|---|---|
| 2003/0086044 A1 | 5/2003 | Nakanishi |
| 2003/0137628 A1 | 7/2003 | Nagaoka |
| 2003/0160750 A1 | 8/2003 | Ueda |
| 2005/0099582 A1 | 5/2005 | Doi |
| 2005/0219186 A1 | 10/2005 | Kamada |
| 2005/0253988 A1 | 11/2005 | Inoue et al. |
| 2006/0146243 A1 | 7/2006 | Nakanishi et al. |
| 2006/0169983 A1 | 8/2006 | Sawamizu |
| 2006/0244881 A1 | 11/2006 | Hanaoka |
| 2007/0035691 A1 | 2/2007 | Sugiura et al. |
| 2007/0132929 A1 | 6/2007 | Kataoka |
| 2008/0007681 A1 | 1/2008 | Chen et al. |
| 2009/0141226 A1 | 6/2009 | Kataoka |
| 2009/0230399 A1 | 9/2009 | Sawamizu |

FOREIGN PATENT DOCUMENTS

| | | |
|---|---|---|
| CN | 1677179 A | 10/2005 |
| JP | 2002-289857 | 10/2002 |
| JP | 2004-219827 | 8/2004 |
| JP | 2004-271971 | 9/2004 |

OTHER PUBLICATIONS

International Search Report dated Dec. 7, 2010.
International Search Report for PCT/JP2008/054406, mailed Jun. 3, 2008.

\* cited by examiner

LIQUID CRYSTAL DISPLAY DEVICE

This application is the U.S. national phase of International Application No. PCT/JP2008/054406, filed 11 Mar. 2008, which designated the U.S. and claims priority to Japanese Patent Application No. 2007-169654, filed 27 Jun. 2007, the entire contents of each of which are hereby incorporated by reference.

TECHNICAL FIELD

The present invention relates to formation of a contact portion of an electrode in a liquid crystal display device.

BACKGROUND ART

An MVA (Multi-domain Vertical Alignment) liquid crystal display device which includes vertical alignment liquid crystal is used for securing a good contrast and a wide viewing angle characteristic. This type of liquid crystal display device includes a liquid crystal layer divided into a plurality of domains which differ from each other in a direction in which the liquid crystal molecules tilt when a voltage is applied across the liquid crystal layer. This type of liquid crystal display device, however, has the following problem: Because (i) each domain has two dark lines occurring along both side edges of a projection pattern which controls an alignment direction of the liquid crystal molecules and (ii) a retardation is reduced in a portion of the liquid crystal layer which portion corresponds to a high portion of the projection pattern, a transmittance of the liquid crystal panel is reduced and accordingly a contrast ratio becomes lower. In addition, this type of liquid crystal display device has such a problem that a response speed of the liquid crystal molecules cannot be increased because a controlled alignment of the liquid crystal molecules is propagated with a delay to a portion which is not in the vicinity of the projection pattern.

Figure 5:
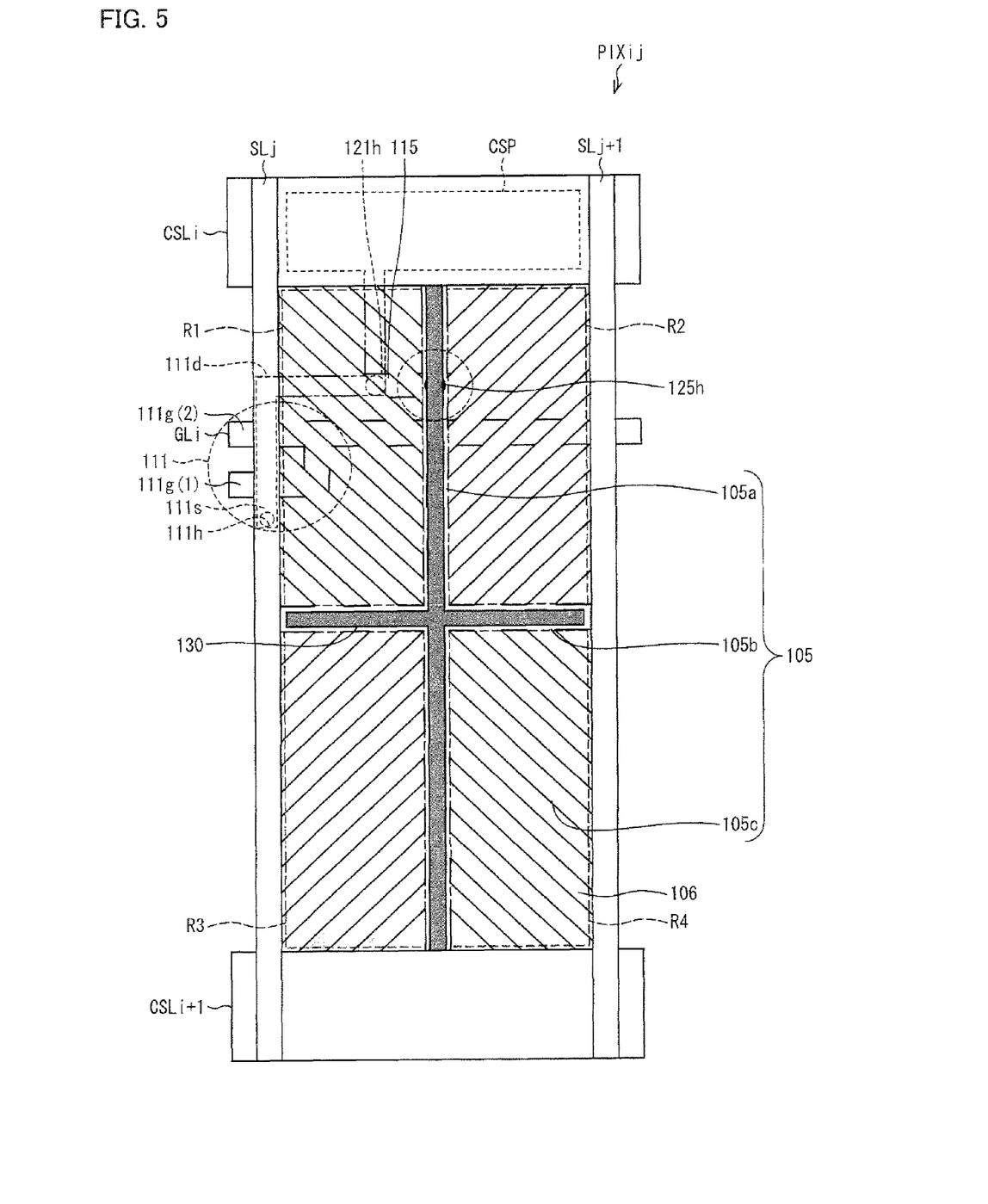
FIG. 5, related to a conventional art, is a plan view illustrating a configuration of a pixel included in a liquid crystal display device.

In order to solve these problems, there has been proposed a liquid crystal display device provided with pixels having the configuration shown in FIG. 5. The similar configuration is disclosed in, for example, Patent Literatures 1 through 4.

FIG. 5 illustrates a configuration of a pixel PIXij which is provided so as to correspond to a portion where an numbered gate bus line GLi and a j-numbered source bus line SLj intersect with each other, the configuration being viewed in the substrate facing one side of the liquid crystal layer. The pixel PIXij is provided in a region surrounded by (i) auxiliary capacitor bus lines CSLi and CSLi+1 which are adjacent to each other and (ii) source bus lines SLj and SLj+1 which are adjacent to each other. The auxiliary capacitor bus line CSLi is provided in parallel with the gate bus line GLi, and the gate bus line GLi is provided between the auxiliary capacitor bus line CSLi and the auxiliary capacitor bus line CSLi+1.

A TFT section 111 is provided at the portion where the gate bus line GLi and the source bus line SLj intersect with each other. The TFT section 111 includes two gate electrodes, i.e., gate electrodes 111g(1) and 111g(2). The gate electrode 111g(1) is an electrode drawn from the gate bus line GLi, and intersects with the source bus line SLj so as to be closer to the auxiliary capacitor bus line CSLi+1 than the gate bus line GLi is. The gate electrode 111g(2) is a part of the gate bus line GLi which part includes the portion where the gate bus line GLi intersects with the source bus line SLj.

There formed a Si conductive layer right below the source bus line SLj, which Si conductive layer is disposed above the gate electrodes 111g(1) and 111g(2) so as to intersect with the gate electrodes 111g(1) and 111g(2). A portion of the Si conductive layer which portion is closer to the auxiliary capacitor bus line CSLi+1 than the gate electrode 111g(1) is constitutes a source section 111s of the TFT section 111, and a portion of the Si conductive layer which portion is closer to the auxiliary capacitor bus line CSLi than the gate electrode 111g(2) is constitutes a drain section 111d of the TFT section 111. The source section 111s is connected with the source bus line SLj through a contact hole 111h. The drain section 111d is routed to the inside of the pixel region, and is connected with a connecting wire 115 through a contact hole 121h, which connecting wire 115 is disposed above the drain section 111d. The connecting wire 115 is connected with a pixel electrode 105 through a contact hole 125h, which pixel electrode 105 is disposed above the connecting wire 115. Further, the drain section 111d is routed from the inside of the pixel region to a position above the auxiliary capacitor bus line CSLi, and is connected with an auxiliary capacitor electrode pad CSP which is disposed to be opposed to the auxiliary capacitor bus line CSLi from above the auxiliary capacitor bus line CSLi. The auxiliary capacitor bus line CSLi and the auxiliary capacitor electrode pad CSP form an auxiliary capacitance Cs.

The pixel electrode 105 is made of a transparent electrode, and includes a main line 105a, a main line 105b, and stripe portions 105c. The main line 105a is provided to extend in parallel with the source bus line SLj, and the main line 105b is provided to extend in parallel to the gate bus line GLi. The main line 105a and the main line 105b are cross-connected with each other at a center of the pixel PIXij, on a surface of the panel. Disposing the main line 105a and the main line 105b as described above provides, in the pixel electrode 105, four regions R1, R2, R3, and R4 divided by the main line 105a and the main line 105b. Each of the regions includes a plurality of stripe portions 105c extending in the same direction which forms an angle of 45 degrees with respect to the gate bus line GLi and the source bus line SLj. The plurality of stripe portions 105c are connected with the main lines 105a and 105b. Each of the regions includes a cut-out pattern 106 between a stripe portion 105c and its adjacent stripe portion 105c, in which cut-out pattern 106 no transparent electrode is formed. This provides a striped electrode pattern in which the stripe portions 105 are periodically arranged in a direction orthogonal to the direction in which the stripe portions 105c extend. A stripe line direction (in which the stripe portions 105c extend) of a region differs by 90 degrees from that of its adjacent region neighboring across the main line 105a or the main line 105b. In a case where the pixel electrode 105 region extends beyond the stripe portions 105c and reaches an outer peripheral of the pixel PIXij, the stripe portions 105c are also connected with an outer peripheral region of the pixel electrode 105.

The contact between the connecting wire 115 and the pixel electrode 105 through the contact hole 125h is made in the vicinity of a portion right below the main line 105a.

A substrate having the above-described configuration and a counter substrate opposed to this substrate sandwich a vertical alignment liquid crystal layer. Applying a voltage to the pixel electrode 105 and an electrode of the counter substrate causes the liquid crystal layer to be driven. Further, the configuration in which the liquid crystal layer is sandwiched by these two substrates is externally sandwiched by two polarization plates, each of which polarization plates is made of a linear polarization plate. One of the polarization plates is set so that its light absorption axis is in parallel with the main line 105a, and the other one of the polarization plates is set so that its light absorption axis is in parallel with the main line 105b.

Figure 6:
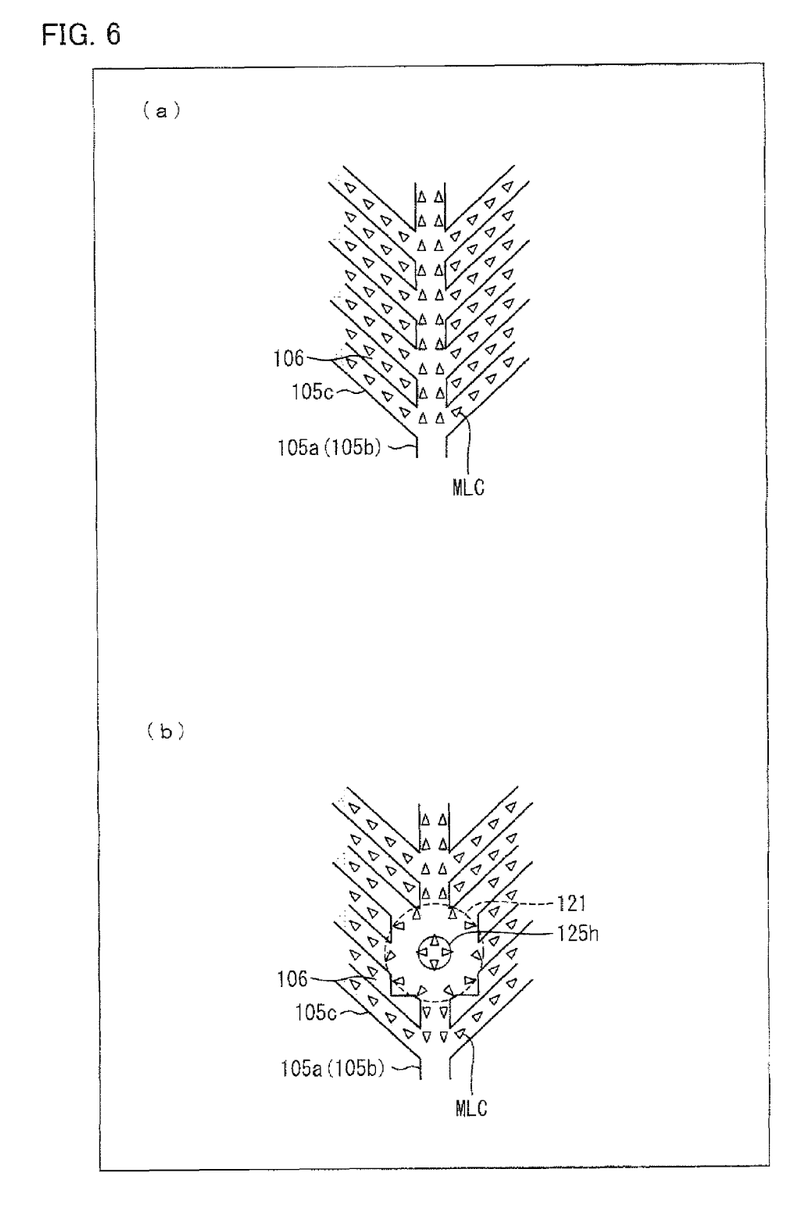
FIG. 6 is a plan view illustrating alignments of liquid crystal molecules. (a) of FIG. 6 shows an alignment of liquid crystal molecules observed in a region where no contact hole exists. (b) of FIG. 6 shows an alignment of liquid crystal molecules observed in a region where a contact hole exists.

According to the above-described pixel PIXij, as shown in (a) of FIG. 6, while liquid crystal molecules MLC are driven, the liquid crystal molecules MLC tilt along a direction in which the cut-out pattern 106 extends, due to an effect of an electric field which is formed by the cut-out pattern 106 and which changes periodically in a direction orthogonal to the direction in which the cut-out pattern 106 extends. A side of each liquid crystal molecule MLC which side is depicted as wider in (a) of FIG. 6 points to the counter substrate during a vertical alignment mode. This side of each liquid crystal molecule tilts toward the main line 105a (or 105b). On the main line 105a (or 105b), the liquid crystal molecules tilt in an up-to-down direction in FIG. 6 from its vertical orientation state.

Since the light absorption axes of the two linear polarization plates are set to form a cross defined by (i) the direction parallel with the main line 105a and (ii) the direction orthogonal to the direction parallel with the main line 105a, a dark line occurs on each of the main lines 105a and 105b. However, unlike in conventional ones, two dark lines do not occur along both side edges of one projection pattern. Therefore, a transmittance during a driving mode is significantly improved. In addition, since the direction in which the liquid crystal molecules MC tilt is not defined by tilting of other liquid crystal molecules MLC, the liquid crystal molecules can be quickly changed from a vertical orientation state to a horizontal orientation state, and vice versa, that is, a response speed is very high. Furthermore, since the regions R1 to R4 are different from each other in the direction in which the liquid crystal molecules MLC tilt, the liquid crystal display device can exhibit a wide viewing angle characteristic.

Patent Literature 1: Japanese Patent Application Publication, Tokukai, No. 2002-107730 A (Publication Date: Apr. 10, 2002)

Patent Literature 2: Japanese Patent Application Publication, Tokukai, No. 2003-149647 A (Publication Date: May 21, 2003)

Patent Literature 3: Japanese Patent Application Publication, Tokukai, No. 2003-177418 A (Publication Date: Jun. 27, 2003)

Patent Literature 4: Japanese Patent Application Publication, Tokukai, No. 2003-255305 A (Publication Date: Sep. 10, 2003)

Patent Literature 5: Japanese Patent Application Publication, Tokukai, No. 2006-208881 A (Publication Date: Aug. 10, 2006)

Patent Literature 6: Japanese Patent Application Publication, Tokukai, No. 2002-289857 A (Publication Date: Oct. 4, 2002)

SUMMARY OF INVENTION

The above-described conventional liquid crystal display device, however, has the following problem: Since the contact between the connecting wire 115 and the pixel electrode 105 made through the contact hole 125h is in the vicinity of the portion right below the main line 105a, there occurs a region 121 around the contact portion between the wire 115 and the pixel electrode 105, in which region 121 an alignment of the liquid crystal molecules MLC is disordered, as shown in (b) of FIG. 6. The region 121 is quite likely to extend beyond the main line 105a region (or the main line 105b region). In such a case, a light-transmitting region includes a region in which an alignment of the liquid crystal molecules MLC is disordered. Consequently, deterioration in a display quality is apt to occur.

The present invention was made in view of the foregoing problem, and an object of the present invention is to provide a liquid crystal display device in which a contact is made with a pixel electrode having a striped electrode pattern having a periodical arrangement, while alignment disorder of liquid crystal molecules is not reflected on a display.

In order to solve the foregoing problem, a liquid crystal display device of the present invention includes: a liquid crystal layer; two substrates by which the liquid crystal layer is sandwiched; electrodes respectively provided in the two substrates, the electrodes applying a voltage across the liquid crystal layer; and signal lines including a gate bus line and a source bus line, one of the two substrates being provided with a selecting element of a pixel, said one of the two substrates being provided with a first electrode serving as one of the electrodes, the first electrode having a striped electrode pattern which causes liquid crystal molecules to be aligned along a stripe line direction when a voltage is applied across the liquid crystal layer, a contact portion of the first electrode with the selecting element being made in a region opposed to, along a film thickness direction, a first region to which one of the signal lines is allocated.

With this invention, since the contact portion of the first electrode with the selecting element is made in the region opposed to the signal line along the film thickness direction, the contact portion is shielded from light to be transmitted through the pixel such as light from the backlight. Consequently, it is possible to prevent a display from being badly affected by alignment disorder of the liquid crystal molecules, which alignment disorder occurs in the contact portion. This makes it possible to carry out a high-quality display, without impairing such a characteristic that the liquid crystal molecules are aligned along the stripe line direction when a voltage is applied across the liquid crystal layer.

Thus, it is possible to provide a liquid crystal display device in which a contact is made with a pixel electrode having a striped electrode pattern having a periodical arrangement, while alignment disorder of liquid crystal molecules is not reflected on a display.

Further, since the contact portion is made by using the region opposed to the signal line along the film thickness direction, which is an existing region, it is possible to prevent alignment disorder of the liquid crystal molecules without causing a reduction in an aperture ratio of the pixel.

In order to solve the foregoing problem, the liquid crystal display device of the present invention is configured such that: said one of the signal lines allocated to the first region is the gate bus line.

With this invention, it is possible to provide a region in which the contact portion can be easily formed.

Further, in a case where the gate bus line is disposed so as to run through a center of the pixel, it is possible to form the contact portion at the center of the pixel. This is effective for a pixel having a small area.

In order to solve the foregoing problem, the liquid crystal display device of the present invention is configured such that: said one of the signal lines allocated to the first region is the source bus line.

With this invention, it is possible to provide a region in which the contact portion can be easily formed.

In order to solve the foregoing problem, the liquid crystal display device of the present invention is configured such that: the signal lines include an auxiliary capacitor bus line; and said one of the signal lines allocated to the first region is the auxiliary capacitor bus line.

With this invention, it is possible to provide a region in which the contact portion can be easily formed.

Further, in a case where the auxiliary capacitor bus line is disposed so as to run through a center of the pixel, it is possible to form the contact portion at the center of the pixel. This is effective for a pixel having a small area.

In order to solve the foregoing problem, a liquid crystal display device of the present invention includes: a liquid crystal layer; two substrates by which the liquid crystal layer is sandwiched; electrodes respectively provided in the two substrates, the electrodes applying a voltage across the liquid crystal layer; and signal lines including a gate bus line and a source bus line, one of the two substrates being provided with a selecting element of a pixel, said one of the two substrates being provided with a first electrode serving as one of the electrodes, the first electrode having a striped electrode pattern which causes liquid crystal molecules to be aligned along a stripe line direction when a voltage is applied across the liquid crystal layer, a contact portion of the first electrode with the selecting element being provided in a region opposed to, along a film thickness direction, a first region to which a light-shielding region for blocking light is allocated, the light transmitting through the pixel unless the light-shielding region is provided.

With this invention, since the contact portion of the first electrode with the selecting element is provided in the region opposed to, along the film thickness direction, the light-shielding region for blocking the light which transmits through the pixel unless the light-shielding region is provided, the contact portion is shielded from such the light, for example, light from the backlight. Consequently, it is possible to prevent a display from being badly affected by alignment disorder of the liquid crystal molecules, which alignment disorder occurs in the contact portion. This makes it possible to carry out a high-quality display, without impairing such a characteristic that the liquid crystal molecules are aligned along the stripe line direction when a voltage is applied across the liquid crystal layer.

Thus, it is possible to provide a liquid crystal display device in which a contact is made with a pixel electrode having a striped electrode pattern having a periodical arrangement, while alignment disorder of liquid crystal molecules is not reflected on a display.

In order to solve the foregoing problem, the liquid crystal display device of the present invention is configured such that: a member which blocks light in the first region is electrically floated.

With this invention, in a case where it is not necessary to intentionally apply a certain electric potential to the member which blocks light in the first region, it is possible to omit a configuration for applying an electric potential. This makes it possible to improve flexibility in forming the first region and to simplify steps of forming the first region.

In order to solve the foregoing problem, the liquid crystal display device of the present invention is configured such that: said liquid crystal display device includes a reflective region and a transmissive region each of which is provided in the pixel, and is capable of carrying out a display in a reflective display mode and in a transmissive display mode; and the light-shielding region is the reflective region.

With this invention, it is possible to cause an existing region i.e., the reflective region to also serve as the light-shielding region which blocks light to be transmitted through the pixel.

In order to solve the foregoing problem, the liquid crystal display device of the present invention includes a black matrix, the light-shielding region being the black matrix.

With this invention, it is possible to cause an existing region i.e., the black matrix to also serve as the light-shielding region for blocking the light which transmits through the pixel unless the light-shielding region is provided.

In order to solve the foregoing problem, the liquid crystal display device of the present invention is configured such that: the first electrode includes a main line by which the striped electrode pattern is divided into a plurality of regions and with which all of the plurality of regions of the striped electrode pattern are electrically connected; each one of the plurality of regions differs in the stripe line direction from its adjacent region across the main line which serves as a border therebetween; and the main line is provided so as to include the contact portion.

With this invention, the region differs in the stripe line direction from its adjacent region across the main line which serves as a border therebetween and is connected with each region of striped electrode pattern. Therefore, the regions adjacent to each other differ from each other in a direction in which the liquid crystal molecules tilt when a voltage is applied across the liquid crystal layer. This provides a wide viewing angle characteristic.

In order to solve the foregoing problem, the liquid crystal display device of the present invention is configured such that: the main line includes (i) a first main line section disposed in parallel with the gate bus line and (ii) a second main line section disposed in parallel with the source bus line, the first main line section and the second main line section being cross-connected with each other so as to divide the striped electrode pattern into four regions; and the four regions differ from each other in a direction in which the liquid crystal molecules tilt.

With this invention, these four regions differ from each other in a direction in which the liquid crystal molecules tilt when a voltage is applied across the liquid crystal layer. This provides a wide viewing angle characteristic.

In order to solve the foregoing problem, the liquid crystal display device of the present invention is configured such that: the stripe line direction of each of the four regions extends at an angle with respect to the first main line section and the second main line section.

With this invention, a side-to-side viewing angle and an up-and-down viewing angle with respect to the panel can be uniformly widened.

In order to solve the foregoing problem, the liquid crystal display device of the present invention is configured such that: the stripe line direction of each of the four regions forms an angle of 45 degrees with respect to the first main line section and the second main line section.

With this invention, viewing angles in directions from the surrounding of the panel can be uniformly widened.

In order to solve the foregoing problem, the liquid crystal display device of the present invention is configured such that: the liquid crystal layer includes a polymer for controlling at least one of (i) a pretilt angle of the liquid crystal molecules and (ii) a direction in which the liquid crystal molecules tilt while the liquid crystal molecules are driven.

With this invention, it is possible to eliminate the need for a projection pattern for alignment, an alignment film, and rubbing.

In order to solve the foregoing problem, the liquid crystal display device of the present invention is configured such that: at least part of the main line is provided in the region opposed to the first region along the film thickness direction.

With this invention, in a case where a linear polarization plate is used as a polarization plate of the liquid crystal display device and the main line of the first electrode exists in parallel with an absorption axis of the linear polarization plate, light which has been emitted from the backlight and proceeds so as to transmit through the pixel is blocked by the main line, and consequently a portion of the pixel which portion corresponds to the main line appears as a dark line. In order to avoid this, the main line is provided in the region opposed to the first region along the film thickness direction. That is, the first region, which is utilized to form the contact portion of the first electrode with the selecting element, is further utilized. This makes it possible to improve a transmittance of the panel, as compared with a case where the first region is provided in another portion through which light is transmitted.

In a case where the main line is not shielded from light, the following may occur: When a display surface is observed at an oblique angle, not from the front, a different tinge is observed due to the alignment of the liquid crystal molecules in the main line region, and consequently a variation occurs in a display quality. On the other hand, by causing the main line to be shielded from light by means of the first region, it is possible to reproduce a tinge based on the alignment of only the liquid crystal molecules in the striped electrode pattern. This provides a display quality with a wide viewing angle. In a case where this effect is desired, the light-shielding material may be electrically floated.

In order to solve the foregoing problem, the liquid crystal display device of the present invention is configured such that: the selecting element is a thin-film transistor.

With this invention, in a display device using the TFT as the selecting element of the pixel, it is possible to make a contact between the first electrode and the TFT, while preventing alignment disorder of the liquid crystal molecules from being reflected on a display.

In order to solve the foregoing problem, the liquid crystal display device of the present invention is configured such that: a source section of the thin-film transistor and a region between the source section and a drain section of the thin-film transistor are provided in a region being opposed to the source bus line along the film thickness direction; and the drain section is routed, to the contact portion, from the region being opposed to the source bus line along the film thickness direction.

With this invention, the source section and the region between the source section and the drain section are provided in the region opposed to the source bus line along the film thickness direction. Therefore, in the liquid crystal display device including the TFT whose drain section is routed from said region to the contact portion, it is possible to make a contact between the first electrode and the drain section of the TFT, while preventing alignment disorder of the liquid crystal molecules from being reflected on a display.

For a fuller understanding of the nature and advantages of the invention, reference should be made to the ensuing detailed description taken in conjunction with the accompanying drawings.

REFERENCE SIGNS LIST

1 Liquid crystal display device
15 Pixel electrode (first electrode)
15a First main line section
15b Second main line section

DESCRIPTION OF EMBODIMENTS

One embodiment of the present invention is described below with reference to FIG. 1 through FIG. 4.

Figure 4:
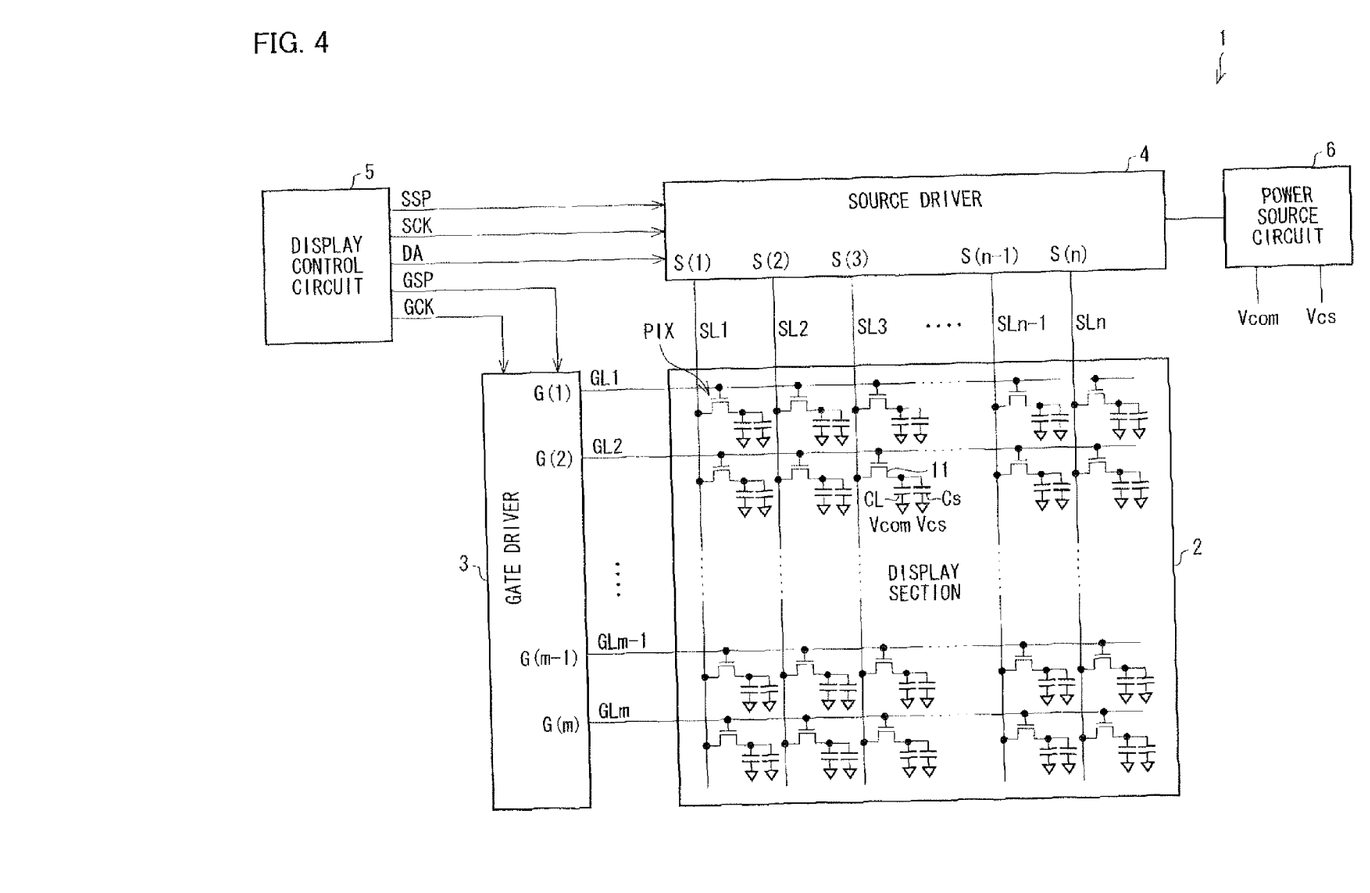
FIG. 4 is a block diagram illustrating a configuration of a liquid crystal display device including the pixel shown in FIG. 1.

FIG. 4 illustrates a configuration of a liquid crystal display device 1 of the present embodiment.

The liquid crystal display device 1 is an active matrix display device. The liquid crystal display device 1 includes: a gate driver 3 serving as a scanning signal line driving circuit; a source driver 4 serving as a data signal line driving circuit; a display section 2; a display control circuit 5 for controlling the gate driver 3 and the source driver 4; and a power source circuit 6.

The display section 2 includes: gate bus lines GL1 to GLm as a plurality of (m number of) scanning signal lines (signal lines); source bus lines SL1 to SLn as a plurality of (n number of) data signal lines (signal lines) intersecting with their respective gate bus lines GL1 to GLm; and a plurality of (m×n number of) pixels PIX provided in portions where their respective gate bus lines GL1 to GLm and their respective source bus lines SL1 to SLn intersect with each other. The display section 2 also includes auxiliary capacitor bus lines (signal lines) CSL (not illustrated) which are arranged in parallel with the gate bus lines GL1 to GLm (see FIG. 1 described later). Each auxiliary capacitor bus line CSL is allocated to one pixel row including n pixels arranged in the direction in parallel with the gate bus lines GL1 to GLm.

The plurality of pixels PIX are arranged in a matrix so as to constitute a pixel array. Each of the pixels PIX includes a TFT section (selecting element) 11, a liquid crystal capacitance CL, and an auxiliary capacitance Cs. The liquid crystal capacitance CL is formed by a pixel electrode, a counter electrode opposed to the pixel electrode, and a liquid crystal layer sandwiched by the pixel electrode and the counter electrode. A voltage Vcom is applied to the counter electrode by the power source circuit 6. The liquid crystal capacitance CL and the auxiliary capacitance Cs constitute a pixel capacitance, and a parasitic capacitance formed between the pixel electrode and wiring on the periphery thereof also exists as another capacitance constituting the pixel capacitance.

The display control circuit 5 supplies, to the gate driver 3, a gate start pulse GSP and a gate clock GCK. The display control circuit 5 supplies, to the source driver 4, a source start pulse SSP, a source clock SCK, and display data DA.

Figure 1:
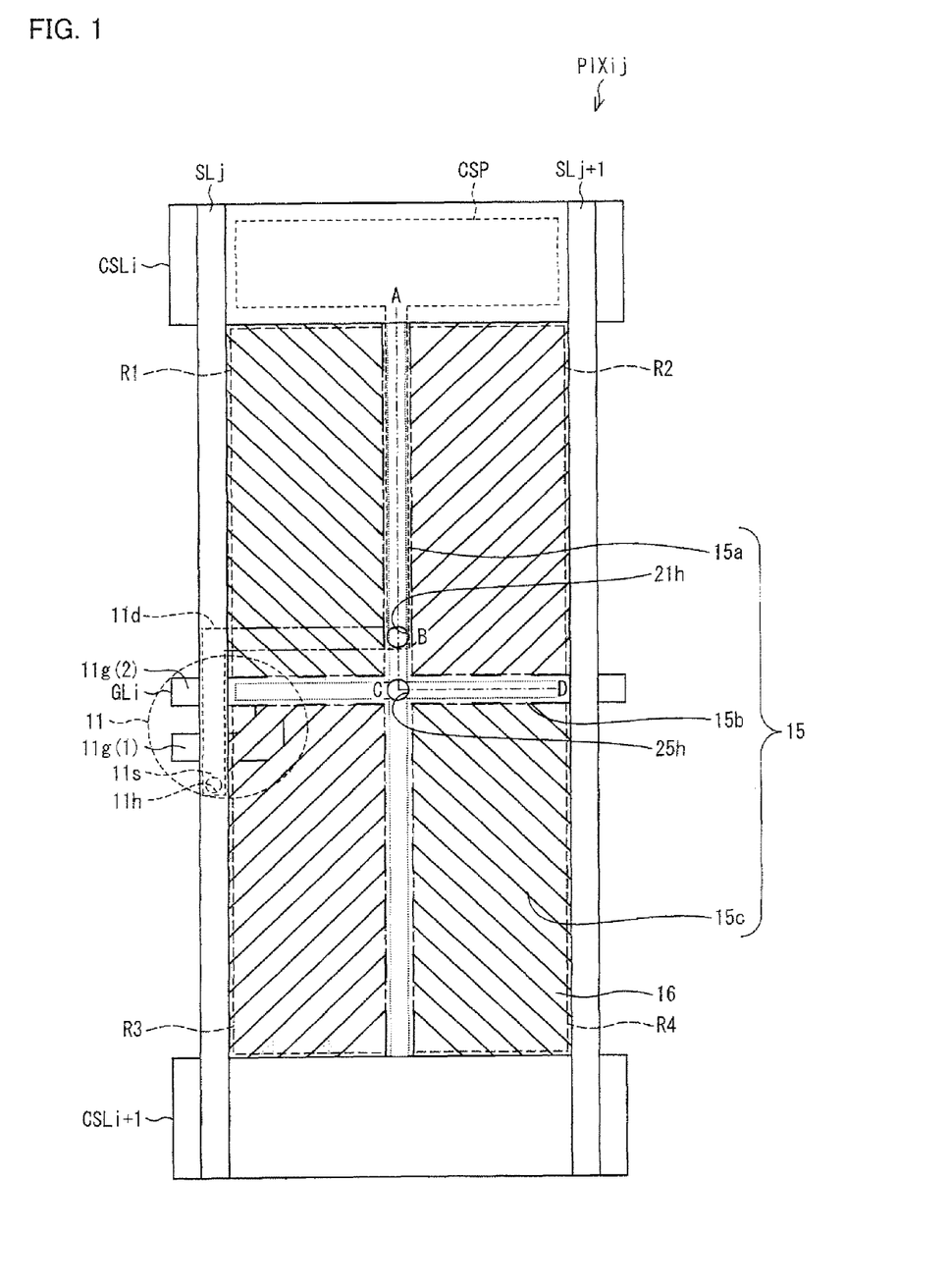
FIG. 1, related to an embodiment of the present invention, is a plan view illustrating a configuration of a pixel included in a liquid crystal display device.

Next, the following describes a configuration of the pixel PIX with reference to FIG. 1.

FIG. 1 illustrates a configuration of the pixel PIXij which is provided so as to correspond to a portion where an i-numbered gate bus line GLi and a j-numbered source bus line SLj intersect with each other, the configuration being viewed in the substrate facing one side of the liquid crystal layer. The PIXij is provided in a region surrounded by (i) auxiliary capacitor bus lines CSLi and CSLi+1 which are adjacent to each other and (ii) source bus lines SLj and SLj+1 which are adjacent to each other. The auxiliary capacitor bus line CSLi is provided in parallel with the gate bus line GLi, and the gate bus line GLi is provided between the auxiliary capacitor bus line CSLi and the auxiliary capacitor bus line CSLu+1. The gate bus line GLi herein is provided so as to divide equally a region between the auxiliary capacitor bus line CSLi and the auxiliary capacitor bus line CSLi+1.

The TFT section 11 is provided at the portion where the gate bus line GLi and the source bus line SLj intersect with each other. The TFT section 11 includes two gate electrodes i.e., gate electrodes 11g(1) and 11g(2). The gate electrode 11g(1) is an electrode drawn from the gate bus line GLi, and intersects with the source bus line SLj so as to be closer to the auxiliary capacitor bus line CSLi+1 than the gate bus line GLi is. The gate electrode 111g(2) is a part of the gate bus line GLi which part includes the portion where the gate bus line GLi intersects with the source bus line SLj.

There formed a Si conductive layer right below the source bus line SLj, which Si conductive layer is provided above the gate electrodes 11g(1) and 11g(2) so as to intersect with the gate electrodes 11g(1) and 11g(2). The Si conductive layer is, for example, an n+ Si layer used as a contact layer in source/drain regions of the TFT section 11. A portion of the Si conductive layer which portion is closer to the auxiliary capacitor bus line CSLi+1 than the gate electrode 11g(1) is constitutes a source section 11s of the TFT section 11, and a portion of the Si conductive layer which portion is closer to the auxiliary capacitor bus line CSLi than the gate electrode 11g(2) is constitutes a drain section lid of the TFT section 11.

Thus, the TFT section 11 includes two gate electrodes, that is, the TFT section 11 includes two TFTs arranged in series. Alternatively, the TFT section 11 may include only one TFT.

The source section 1 is connected with the source bus line SLj through a contact hole 11h. The drain section 11d is routed to the inside of the pixel region, and is connected with a connecting wire 35 (see FIG. 2 described later) through a contact hole 21h, which connecting wire 35 is disposed above the drain section 11d. The contact hole 21h herein is provided right below a first main line section 15a included in a pixel electrode 15 (described later). The connecting wire 35 is connected with the pixel electrode 15 through a contact hole 25h, which pixel electrode 15 is disposed above the connecting wire 35. The contact hole 25h is provided above the gate bus line GLi. The contact hole 25h herein is provided right below a portion where the first main line section 15a and a second main line section 15b, each included in the pixel electrode 15, are cross-connected with each other.

Further, the drain section 11d is routed through a portion right below the first main line section 15a so as to extend from the position of the contact hole 21h to a position above the auxiliary capacitor bus line CSLi, and is connected with an auxiliary capacitor electrode pad CSP which is disposed to be opposed to the auxiliary capacitor bus line CSLi from above the auxiliary capacitor bus line CSLi. The auxiliary capacitor bus line CSLi and the auxiliary capacitor electrode pad CSP form an auxiliary capacitance Cs.

The pixel electrode (first electrode) 15 is made of a transparent electrode, and includes the first main line section 15a, the second main line section 15b, and stripe portions 15c. The first main line section 15a is provided to extend in parallel with the source bus line SLj, and the second main line section 15b is provided to extend in parallel with the gate bus line GLi. The first main line section 15a and the second main line section 15b are cross-connected with each other at a center of the pixel PIXij, on a surface of the panel. The first main line section 15a and the second main line section 15b constitute a main line in one pixel electrode 15. The second main line section 15b is disposed above the gate bus line GLi. Disposing the first main line section 15a and the second main line section 15b as described above provides, in the pixel electrode 15, four regions R1, R2, R3, and R4 divided by the first main line section 15a and the second main line section 15b.

Each of the regions includes a plurality of stripe portions 15c extending in the same direction which forms an angle of 45 degrees with respect to the gate bus line GLi and the source bus line SLj. The plurality of stripe portions 15c are connected with the first main line section 15a and the second main line section 15b. Each of the regions includes a cut-out pattern 16 between a stripe portion 15c and its adjacent stripe portion 15c, in which cut-out pattern 106 no transparent electrode is formed. This provides a line-and-space striped electrode pattern in which the stripe portions 15 are arranged periodically in a direction orthogonal to the direction in which the stripe portions 15c extend. A stripe line direction (in which the stripe portions 105c extend) of a region differs by 90 degrees from its adjacent region neighboring across the first main line section 15a or the second main line section 15b each of which serves as a border therebetween. In a case where the pixel electrode 15 region extends beyond the stripe portions 15c and reaches an outer peripheral of the pixel PIXij, the stripe portions 15c are also connected with an outer peripheral region of the pixel electrode 15.

A substrate having the above-described configuration and a counter substrate opposed to this substrate sandwich a vertical alignment liquid crystal layer. Applying a voltage to the pixel electrode 15 and an electrode of the counter substrate causes the liquid crystal layer to be driven. Further, the configuration in which the liquid crystal layer is sandwiched by these two substrates is externally sandwiched by two polarization plates, each of which polarization plates is made of a linear polarization plate. One of the polarization plates is set so that its light absorption axis is in parallel with the first main line section 15a, and the other one of the polarization plates is set so that its light absorption axis is in parallel with the second main line section 15b.

The liquid crystal layer used herein is the one in which a liquid crystal composition made of liquid crystal mixed with a polymerizable component (hereinafter, simply referred to as monomer) such as a monomer or an oligomer is filled between the substrates. Under the condition that a voltage is applied to the substrates and the liquid crystal molecules are tilted, the monomer is polymerized so that a polymer is yielded. This provides a liquid crystal layer in which the liquid crystal molecules are tilted at a predetermined pretilt angle even after application of a voltage is stopped, thereby defining a liquid crystal alignment direction. Also, the polymer defines a direction in which the liquid crystal tilt while the liquid crystal is driven. As the monomer, a material which can be polymerized by heat or light (ultraviolet ray) is chosen. The polymer may be the one which defines at least one of (i) a pretilt angle and (ii) a direction in which liquid crystal tilt while the liquid crystal is driven. Use of such a polymer eliminates the need for a projection pattern for alignment, an alignment film, and rubbing. Consequently, for a pixel having a small area, it is possible to improve a transmittance and simplify steps.

Figure 2:
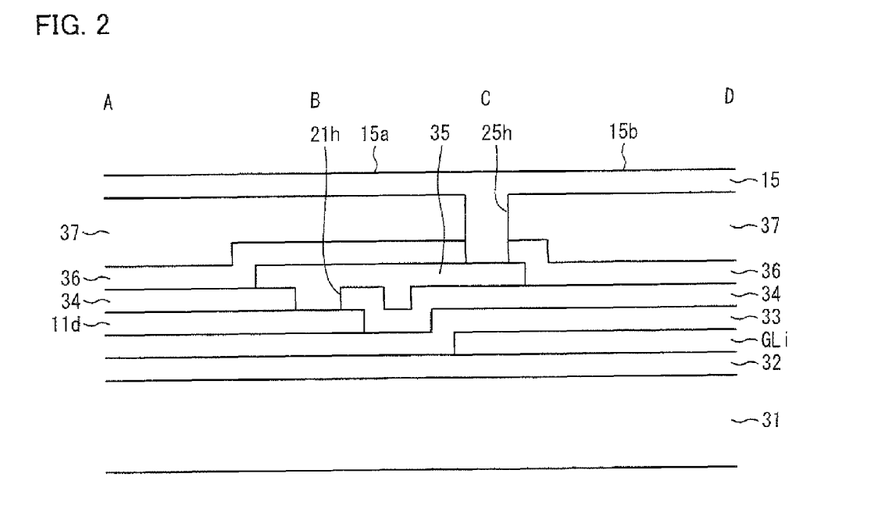
FIG. 2 is a cross-section view illustrating a cross section along A-B-C-D line shown in FIG. 1.

Next, FIG. 2 shows a cross-section view along A-B-C-D line shown in FIG. 1.

On a transparent insulating substrate 31, a base coating 32, the gate bus line GLi, an insulating film 33, the drain section 11d, an insulating film 34, the connecting wire 35, an insulating film 36, a planarizing film 37, and the pixel electrode 15 are formed in this order. The contact hole 21h is formed through the insulating film 34. The contact hole 25h is formed through the insulating film 36 and the planarizing film 37. Here, the connecting wire 35 can be formed of a source metal in a layer in which the source bus line SLi is formed. The base coating 32, the insulating film 34, and the insulating film 36 may be made of e.g., a SiN film or $SiO_2$, and the planarizing film 37 may be made of e.g., a polyimide film or an acrylic resin film.

Figure 3:
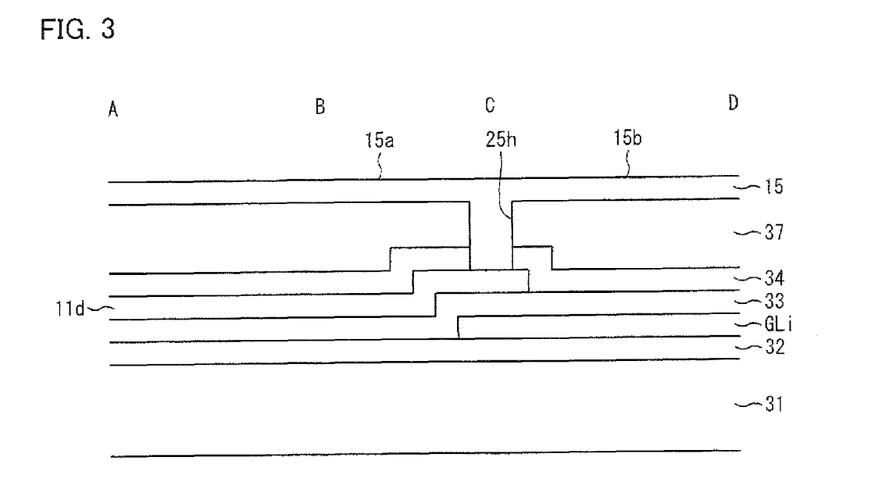
FIG. 3 is a cross-section view illustrating an example of a variation of the cross section shown in FIG. 2.

FIG. 3 shows a cross-section view of an example of a variation of the layered structure shown in FIG. 2.

In the configuration shown in FIG. 3, the connecting wire 35 shown in FIG. 2 is omitted, and a contact with a pixel electrode 15 is made directly from a drain section 11d. A contact hole 25h is formed through an insulating film 34 and a planarizing film 37. The contact hole 21h and the insulating film 36 are no longer necessary. Alternatively, an insulating film 36 may be used instead of the insulating film 34.

As a counter substrate, the one having a conventional configuration can be used, for example, the one including a color filter and a black matrix.

According to the configurations shown in FIG. 1 through FIG. 3, since an upper portion of the contact hole 25h serving as a contact portion of the pixel electrode 15 with the TFT section 11 is disposed in a region opposed to, along a film thickness direction, a region (first region) to which a signal line i.e., the gate bus line GLi is allocated, the contact portion is shielded from light to be transmitted through the pixel (e.g., light from a backlight). Consequently, it is possible to prevent a display from being badly affected by alignment disorder of the liquid crystal molecules, which alignment disorder occurs in the contact portion. This makes it possible to carry out a high-quality display, without impairing such a characteristic that liquid crystal molecules are aligned along a stripe line direction when a voltage is applied across the liquid crystal layer. In addition, the contact portion is formed by using an existing region, that is, the region opposed to, along the film thickness direction, the region to which a signal line i.e., the gate bus line GLi is allocated. This makes it possible to prevent alignment disorder of the liquid crystal molecules, without causing a reduction in an aperture ratio of the pixel.

In the above configuration shown as an example, the contact portion is provided in the region opposed to, along the film thickness direction, the region to which the gate bus line GLi is allocated. However, the present invention is not limited to this. Alternatively, the contact portion may be provided in a region opposed to, along the film thickness direction, a region (first region) to which the source bus line SLi, which is a signal line, or the auxiliary capacitor bus line CSLi, which is a signal line, is allocated. Each of these signal lines provides a region in which the contact portion can be easily formed. In a configuration in which the gate bus line GLi or the auxiliary capacitor bus line CSLi is disposed so as to run through a center of the pixel, it is possible to form a contact portion at the center of the pixel. This is especially effective for a pixel having a small area, as described later. Note that a material of the above-mentioned signal lines is not limited to metal, but may be e.g., a Si conductive layer.

It is preferable that the contact portion is formed in a region opposed to, along the film thickness direction, a region (first region) to which a light-shielding region for blocking light to be transmitted through the pixel is allocated. Examples of the light-shielding region encompass a reflective region of a liquid crystal display device in which the reflective region and a transmissive region are provided in a pixel and which is capable of display in a reflective display mode and in a transmissive display mode. Further, examples of the region which is not the transmissive region encompass a region overlapping a black matrix region of the counter substrate. With these configurations, an existing region can serve as the light-shielding region for blocking light to be transmitted through the pixel. A member which blocks light in the first region may be electrically floated. In a case where it is not necessary to intentionally apply a certain electric potential to the member which blocks light in the first region, it is possible to omit a configuration for applying an electric potential. This makes it possible to improve flexibility in forming the first region and to simplify steps of forming the first region.

Further, in the configurations shown in FIG. 1 through FIG. 3, the second main line section 15b, which is at least part of the main line, is provided in the region opposed to, along the film thickness direction, the first region to which the gate bus line GLi is allocated. In a case where a linear polarization plate is used as a polarization plate of a liquid crystal display device and a main line of a pixel electrode exists in parallel with an absorption axis of the linear polarization plate, light which has been emitted from the backlight and proceeds so as to transmit through the pixel is blocked by the main line, and consequently a portion of the pixel which portion corresponds to the main line appears as a dark line. In order to avoid this, as shown in FIG. 1 through FIG. 3, the main line is provided in the region opposed to the first region along the film thickness direction. This means that the first region, which is utilized to form the contact portion of the pixel electrode 15 with the TFT section 11, is further utilized. Therefore, it is possible to improve a transmittance of the panel, as compared with a case where the first region is provided in another portion through which light is transmitted. In such a case, any of all first regions described above is available as the first region.

In a case where the main line is not shielded from light, the following may occur: When a display surface is observed at an oblique angle, not from the front, a different tinge is observed due to the alignment of the liquid crystal molecules in the main line section, and consequently a variation occurs in a display quality. On the other hand, by causing the main line to be shielded from light by means of the first region, it is possible to reproduce a tinge based on the alignment of only the liquid crystal molecules in the striped electrode pattern. This provides a display quality with a wide viewing angle. In a case where this effect is desired, the light-shielding material may be electrically floated.

As each pixel has a smaller area in a liquid crystal panel in a mobile apparatus, for example, an area of a contact portion of a pixel electrode 15 with a TFT section 11 becomes relatively larger. In view of this, in terms of improvement in a display quality, it is very important to form a contact portion in a light-shielded region as in the present embodiment, for the purpose of preventing alignment disorder of the liquid crystal from occurring in a region(s) contributing to a display. Now, in a case where the contact portion is formed in an end section of the pixel PIXij (e.g., in the region opposed to the auxiliary capacitor bus line CSLi along the film thickness direction as shown in FIG. 1), the smaller the pixel PIXij is made, the smaller a width of the signal line (e.g., auxiliary capacitor bus line CSLi) located at the end section of the pixel becomes. On the other hand, an area of the contact portion does not change so much. Consequently, the contact portion region extends beyond the signal line region. If this may cause a short circuit between the contact portion and an adjacent pixel, it is possible to avoid the problem of a short circuit by forming the contact portion in the region inside the pixel PIXij as shown in FIG. 1. Thus, there is a considerable difference between (i) forming such a contact portion with the TFT section 11 in the pixel PIXij which includes, in the region inside thereof, dark line regions such as the first main line section 15a and the second main line section 15b of the pixel electrode 15 and which has the striped electrode pattern having the periodical arrangement and (ii) forming such a contact portion in a pixel having other configurations.

In the configuration shown in FIG. 1, the pixel electrode 15 is divided into the four regions R1 to R4 by the main line. However, the present invention is not limited to this, but the pixel electrode 15 may be divided into a plurality of regions. In such a configuration, a region and its adjacent region differ from each other in the stripe line direction, and therefore differ from each other in the direction in which the liquid crystal molecules tilt. On this account, these regions differ from each other in the direction in which the liquid crystal molecules tilt when a voltage is applied across the liquid crystal layer. This provides a wide viewing angle characteristic. Further, since the respective stripe line directions are set at an angle with respect to the first main line section 15a and the second main line section 15b, a side-to-side viewing angle and an up-and-down viewing angle are uniformly widened. Furthermore, by setting, to 45 degrees, the angles that the respective stripe line directions form with respect to the first main line section 15a and the second main line section 15b, viewing angles in every direction from the surrounding of the panel are uniformly widened.

The present invention is not limited to the description of the embodiments above, but may be altered by a skilled person within the scope of the claims. An embodiment based on a proper combination of technical means disclosed in different embodiments is encompassed in the technical scope of the present invention.

As describe above, a liquid crystal display device of the present invention includes: a liquid crystal layer; two substrates by which the liquid crystal layer is sandwiched; electrodes respectively provided in the two substrates, the electrodes applying a voltage across the liquid crystal layer; and signal lines including a gate bus line and a source bus line, one of the two substrates being provided with a selecting element of a pixel, said one of the two substrates being provided with a first electrode serving as one of the electrodes, the first electrode having a striped electrode pattern which causes liquid crystal molecules to be aligned along a stripe line direction when a voltage is applied across the liquid crystal layer, a contact portion of the first electrode with the selecting element being made in a region opposed to, along a film thickness direction, a first region to which one of the signal lines is allocated.

With this, it is possible to provide a liquid crystal display device in which a contact is made with a pixel electrode having a striped electrode pattern having a periodical arrangement, while alignment disorder of liquid crystal molecules is not reflected on a display.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention may be suitably applied to a liquid crystal display device of a mobile use.

The invention claimed is:

1. A liquid crystal display device of an active matrix type, comprising:
   a liquid crystal layer;
   two substrates by which the liquid crystal layer is sandwiched;
   electrodes respectively provided in the two substrates, the electrodes applying a voltage across the liquid crystal layer; and
   a gate bus line; and
   a source bus line,
   one of the two substrates being provided with a selecting element of a pixel, said one of the two substrates being provided with a first electrode serving as one of the electrodes, the first electrode having a striped electrode pattern which causes liquid crystal molecules to be aligned along a stripe line direction when a voltage is applied across the liquid crystal layer,
   a contact portion of the first electrode with the selecting element being made in a region opposed to, along a film thickness direction, a first region to which one of the gate bus line and the source bus line is allocated,
   the contact portion being arranged so as to overlap with the gate bus line or the source bus line when the contact portion is viewed from the film thickness direction.

2. A liquid crystal display device of an active matrix type, comprising:
   a liquid crystal layer;
   two substrates by which the liquid crystal layer is sandwiched;
   electrodes respectively provided in the two substrates, the electrodes applying a voltage across the liquid crystal layer; and
   signal lines including a gate bus line and a source bus line,
   one of the two substrates being provided with a selecting element of a pixel, said one of the two substrates being provided with a first electrode serving as one of the electrodes, the first electrode having a striped electrode pattern which causes liquid crystal molecules to be aligned along a stripe line direction when a voltage is applied across the liquid crystal layer,
   a contact portion of the first electrode with the selecting element being provided in a region opposed to, along a film thickness direction, a first region to which a light-shielding region for blocking light is allocated, the light transmitting through the pixel unless the light-shielding region is provided,
   the contact portion being arranged so as to overlap with the light-shielding region when the contact portion is viewed from the film thickness direction.

3. The liquid crystal display device as set forth in claim 2, wherein:
   a member which blocks light in the first region is electrically floated.

4. The liquid crystal display device as set forth in claim 2, wherein: said liquid crystal display device includes a reflective region and a transmissive region each of which is provided in the pixel, and is capable of carrying out a display in a reflective display mode and in a transmissive display mode; and the light-shielding region is the reflective region.

5. The liquid crystal display device as set forth in claim 2, further comprising a black matrix, the light-shielding region being the black matrix.

6. The liquid crystal display device as set forth in claim 1, wherein:
   the first electrode includes a main line by which the striped electrode pattern is divided into a plurality of regions and with which all of the plurality of regions of the striped electrode pattern are electrically connected;

each one of the plurality of regions differs in the stripe line direction from its adjacent region across the main line which serves as a border therebetween; and the main line is provided so as to include the contact portion.

7. The liquid crystal display device as set forth in claim 6, wherein:

the main line includes (i) a first main line section disposed in parallel with the gate bus line and (ii) a second main line section disposed in parallel with the source bus line, the first main line section and the second main line section being cross-connected with each other so as to divide the striped electrode pattern into four regions; and the four regions differ from each other in a direction in which the liquid crystal molecules tilt.

8. The liquid crystal display device as set forth in claim 7, wherein: the stripe line direction of each of the four regions extends at an angle with respect to the first main line section and the second main line section.

9. The liquid crystal display device as set forth in claim 8, wherein:

the stripe line direction of each of the four regions forms an angle of 45 degrees with respect to the first main line section and the second main line section.

10. The liquid crystal display device as set forth in claim 1, wherein: the liquid crystal layer includes a polymer for controlling at least one of (i) a pretilt angle of the liquid crystal molecules and (ii) a direction in which the liquid crystal molecules tilt while the liquid crystal molecules are driven.

11. The liquid crystal display device as set forth in claim 6, wherein: at least part of the main line is provided in the region opposed to the first region along the film thickness direction.

12. The liquid crystal display device as set forth in claim 1, wherein: the selecting element is a thin-film transistor.

13. The liquid crystal display device as set forth in claim 12, wherein:

a source section of the thin-film transistor and a region between the source section and a drain section of the thin-film transistor are provided in a region being opposed to the source bus line along the film thickness direction; and the drain section is routed, to the contact portion, from the region being opposed to the source bus line along the film thickness direction.

* * * * *